(12) United States Patent
Seitz

(10) Patent No.: US 7,134,642 B2
(45) Date of Patent: Nov. 14, 2006

(54) VACUUM GATE VALVE

(75) Inventor: Daniel Seitz, Oberriet (CH)

(73) Assignee: Vat Holding AG, Haag (CH)

( * ) Notice: Subject to any disclaimer, the term of this patent is extended or adjusted under 35 U.S.C. 154(b) by 74 days.

(21) Appl. No.: 10/847,464

(22) Filed: May 18, 2004

(65) Prior Publication Data

US 2005/0199848 A1   Sep. 15, 2005

(30) Foreign Application Priority Data

Mar. 12, 2004   (KR)   ............... 10-2004-0017074

(51) Int. Cl.
*F16K 3/16* (2006.01)
(52) U.S. Cl. ............... 251/193; 251/84; 251/87; 251/158; 251/326; 251/329; 251/364; 251/293
(58) Field of Classification Search ............... 251/293, 251/326, 328, 329; 81/177.1, 177.5
See application file for complete search history.

(56) References Cited

U.S. PATENT DOCUMENTS

| | | | | |
|---|---|---|---|---|
| 1,398,889 A | * | 11/1921 | Clark | ............... 81/124.5 |
| 2,786,644 A | * | 3/1957 | Koppl | ............... 251/187 |
| 3,582,116 A | * | 6/1971 | Young | ............... 403/359.1 |
| 3,627,261 A | * | 12/1971 | Ludeman | ............... 251/305 |
| 5,186,083 A | * | 2/1993 | Hsiao | ............... 81/124.4 |
| 5,415,376 A | | 5/1995 | Ito | |
| 5,641,149 A | | 6/1997 | Ito | |
| 5,755,255 A | | 5/1998 | Iwabuchi | |
| 5,934,646 A | | 8/1999 | Tamura et al. | |
| 6,017,177 A | * | 1/2000 | Lanham | ............... 411/410 |
| 6,045,117 A | | 4/2000 | Tamura et al. | |
| 6,056,267 A | * | 5/2000 | Schneider | ............... 251/204 |
| 6,068,180 A | | 5/2000 | Test | |
| 6,082,706 A | | 7/2000 | Irie | |
| 6,095,180 A | | 8/2000 | Ishigaki et al. | |
| 6,347,918 B1 | * | 2/2002 | Blahnik | ............... 414/217 |
| 6,431,518 B1 | | 8/2002 | Geiser | |
| 6,619,618 B1 | | 9/2003 | Ishigaki et al. | |
| 6,629,682 B1 | | 10/2003 | Duelli | |
| 2004/0245489 A1 | * | 12/2004 | Kurita et al. | ............... 251/195 |
| 2005/0139799 A1 | * | 6/2005 | Tomasch | ............... 251/193 |

* cited by examiner

*Primary Examiner*—J. Casimer Jacyna
(74) *Attorney, Agent, or Firm*—McGrath, Geissler, Olds & Richardson, PLLC

(57) ABSTRACT

The invention provides a vacuum gate valve for closing off an opening. The vacuum gate valve can have a valve plate that can be turned so that the alignment of the valve plate will adapt to a valve seat when the valve plate is pressed against the valve seat.

18 Claims, 6 Drawing Sheets

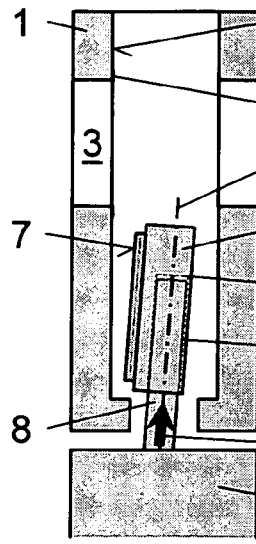
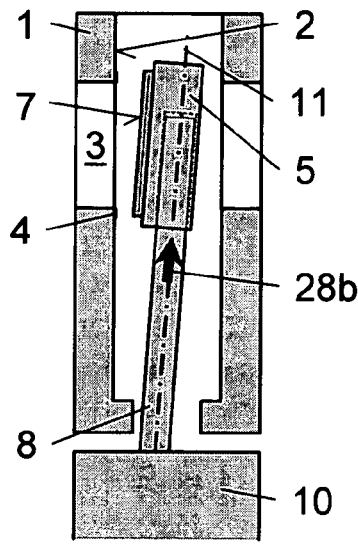
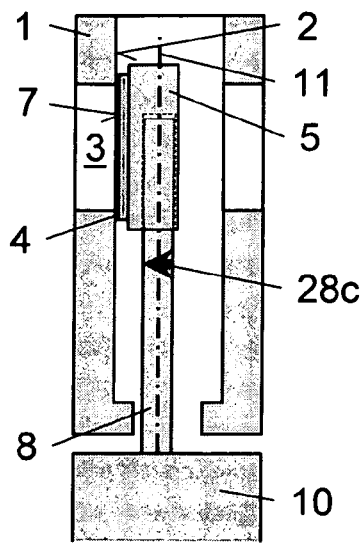
Related Art
Fig. 1a
Related Art
Fig. 1b
Related Art
Fig. 1c
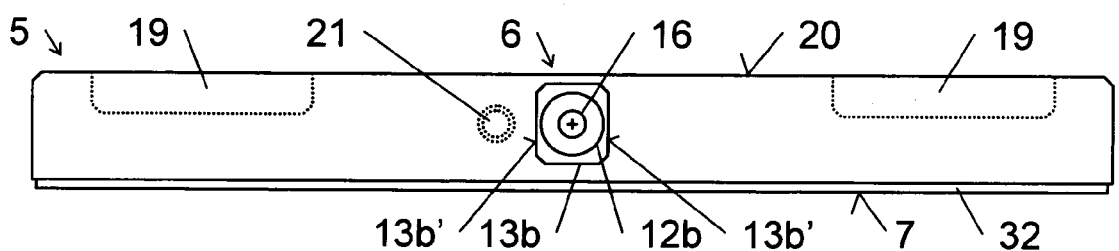
Fig. 2a
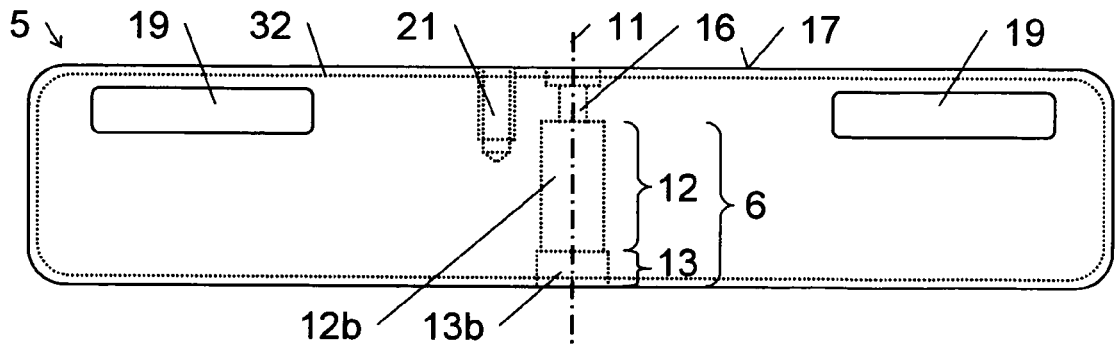
Fig. 2b

VACUUM GATE VALVE

CROSS-REFERENCE TO RELATED APPLICATIONS

This nonprovisional application claims priority under 35 U.S.C. § 119 of South Korean application No. 10-2004-0017074, filed 12 Mar. 2004, which is herein incorporated by reference in its entirety.

FIELD OF THE INVENTION

The invention relates in general to vacuum gate valves.

BACKGROUND OF THE INVENTION

Vacuum gate valves are used to close off an opening in a container or pipeline. Vacuum gate valves primarily of the L-type are utilized in IC and semiconductor manufacturing to exclude, to a large extent in a protected atmosphere, the presence of contaminating particles. For instance, in a production unit for semiconductor wafers or liquid-crystal substrates, the highly sensitive semiconductor or liquid-crystal elements pass through a number of production chambers each of which can be connected to the next via a connecting passage. These passages are opened via vacuum gate valves so that the elements can be transferred from one production chamber to the next and then closed again in gas-tight fashion so that continuing production steps can be performed.

A general schematic of a related art vacuum gate valve is illustrated in FIGS. 1a, 1b and 1c.

FIG. 1a shows the vacuum gate valve in its opened initial position. The vacuum gate valve can have a valve housing 1 with a wall 2 having an opening 3 (e.g. of rectangular shape). A valve seat 4 formed as a flat surface or a surface of special shape, with or without a seal, surrounds the opening 3. A valve plate 5, which in the opened initial position of the vacuum gate valve is positioned in a lateral position to the opening 3, close to the wall 2, is shown in FIG. 1a. The valve plate 5 has a shape, more particularly rectangular, which overlaps the opening 3 in such a way that the opening can be closed off entirely with a sealing face 7 of the valve plate 5. The valve plate 5 is mounted on a valve rod 8 defining a valve rod axis 11. Instead of one single valve rod 8, two parallel valve rods can be can utilized.

The valve rod 8 can essentially be controlled along two degrees of freedom by control organs 10, for instance by a hydraulic-cylinder and swivel-gear unit, as will subsequently be shown in FIGS. 1b and 1c. More particularly the valve rode 8 can be shifted linearly along the valve rod axis 11 and swivelled in a plane normal to wall 2.

In related art systems, closing off the opening 3 is done in two steps. In a first step, occurring between the situations shown in FIGS. 1a and 1b, the valve rod 8 is extended by means of the control organs 10 along the valve rod axis 11, which is shown by two arrows 28a and 28b. The valve plate 5 is moved over the opening 3 along a path essentially parallel to the wall 2 while avoiding contact between the valve plate 5 and the wall 2 or the valve seat 4 of the valve housing 1.

In a second step, occurring between the situations of FIGS. 1b and 1c and symbolically represented by the arrow 28c, the valve rod 8 is swivelled toward the wall 2 by the control organs 10, so that the sealing face 7 of the valve plate 5 (which may for instance hold a sealing ring) is pressed against the valve seat 4 and the opening is closed off firmly, where applicable in a gas-tight fashion. Sealing can be realized, for instance, either via a sealing ring disposed on the sealing face 7 of valve plate 5 and pressed against the valve seat 4 surrounding the opening 3, or via a sealing ring disposed on valve seat 4 against which the sealing face 7 of the valve plate 5 is pressed. The valve seat 4 is generally defined as the opposing face on wall 2 onto which the sealing face 7 of valve plate 5 is pressed, and which thus causes the sealing.

Different sealing devices are known from the related art, for instance from U.S. Pat. No. 6,629,682 B2. The elastic sealing material known under the trade name of Viton®, for instance, is a suitable material for sealing rings. In view of the closing operation occurring in two steps, the sealing ring will hardly be subjected to any shear forces that might destroy it, since the swivelling motion of the valve rod 8 causes an essentially straight-line movement of the valve plate 5 normal to the valve seat 4. From the related art, various kinds of control organs 10 are known which each may give rise to a slightly different direction of control of valve rod 8 and thus of the valve plate 5. Thus, instead of an arched swivel path of valve plate 5 toward valve seat 4, an absolutely linear motion of the valve plate 5 normal to wall 2 can be initiated. Diverse embodiments of vacuum gate valves of the kind cited above are known, for instance, from U.S. Pat. Nos. 6,431,518 B1, 5,415,376 A, 5,641,149 A, 6,045,117 A, 5,934,646 A, 5,755,255 A, 6,082,706, 6,095,180 and 6,629,682 B2.

A particular problem in the related art is the alignment of valve plate 5 relative to valve housing 1. In the first step, moving the valve plate 5 over the opening 3, contact of the sealing face 7 with wall 2 or valve seat 4 can lead to injury to a sealing surface or to the sealing ring. Additionally, in the second step, where pressure is applied, the valve plate 5 should have a precise alignment relative to the valve seat 4, since otherwise the sealing face 7 of the valve plate 5 may not reach its precise position on the valve seat 4.

In related art systems the planes of sealing face 7 and valve seat 4 should be parallel while the pressure is applied, since otherwise the sealing surface along the valve seat would be stressed non-uniformly, which could give rise to poor tightness and to a degradation of the sealing material. Moreover, the valve plate 5 and the valve rod 8 would be subjected to bending and torsional forces. For this reason, control organs 10 in the related art attempt to precisely align the valve rod 8, and thus the valve plate 5.

The joint between valve rod 8 and valve plate 5 is formed for instance by means of a connecting segment 9 on valve rod 8 which is guided into and fastened inside a receptacle 6 formed in valve plate 5. The fastening occurs for instance as described in U.S. Pat. Nos. 6,068,180 and 6,619,618, namely by means of at least one screw inserted from the side opposite to the sealing face.

U.S. Pat. No. 6,619,618 illustrates a vacuum gate valve which has a valve plate of non-uniform wall thickness, viz., thicker in the middle than in the two lateral zones. In the central, thick-walled zone, a semicircular receptacle for a valve rod is formed, the wall thickness between the receptacle and the sealing face being large relative to the wall thickness between the receptacle and the face opposite to the sealing face. The valve rod, at its end, has a connecting segment which also is semicircular, and is introduced into the receptacle. The valve plate is solidly mounted onto the valve rod by means of a screw, screwed in from the side opposite to the sealing face. With the design of valve plate, receptacle and connecting segment, as described in U.S. Pat. No. 6,619,618, it is intended to avoid excessive bending of the valve plate when pressed onto the valve seat, particularly in the lateral zones of an elongated valve plate, without the need for more than a single shaft or larger overall thickness of the valve plate.

In related art systems, the valve plate 5 is subjected to controls or maintenance at certain time intervals, particularly for checking or replacing the sealing ring, in order to attempt to increase the lasting tightness of the vacuum gate valve. With the vacuum gate valves known from the related art, the demounting and re-mounting of the valve plate is found to be difficult, since an intervention from several sides of the valve plate is required to detach the valve plate from the valve rod, e.g. in order to unfasten any mounting screw and take off the valve plate from the valve rod. A safe demounting is not readily achieved without injury to the valve plate 5 or valve housing 1, and particularly the valve seat 4, because of poor ergonomic possibilities for handling the valve plate.

SUMMARY OF THE INVENTION

Exemplary embodiments provide for at least one vacuum gate valve, with a valve plate arranged on a valve rod, the valve plate used to close off an opening by moving the valve plate over the opening and pressing the valve plate onto the opening.

Exemplary embodiments provide for multiple function tools used to mount and demount at least one valve plate.

Exemplary embodiments provide a vacuum gate valve of high reliability, simplified handling and maintenance, and a simple parts design.

Exemplary embodiments provide a vacuum gate valve having a joint between valve rod and valve plate such that the alignment of the valve plate around the valve rod axis can adapt to the valve seat, at least when pressure is applied for a first time, by providing a turning capability.

Exemplary embodiments reduce the need for tedious precise pre-alignment of the valve plate. Contact between the valve housing and the valve plate can be avoided by the use of means confining the turning capability while the valve plate is moved over the opening.

Exemplary embodiments provide for simplification of the maintenance of the vacuum gate valve by providing demounting and re-mounting the valve plate by an operation from at least one side of the valve plate.

Further areas of applicability of embodiments of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

Embodiments of the present invention will become apparent from the following detailed description, taken in conjunction with the drawings in which:

FIGS. 1*a*, 1*b* and 1*c* illustrate the functioning of a related art vacuum gate valve;

FIGS. 2*a* and 2*b* illustrate a valve plate in a bottom view and in a rear view in accordance with at least one exemplary embodiment;

DETAILED DESCRIPTION OF EXEMPLARY EMBODIMENTS OF THE PRESENT INVENTION

Figure 3A:
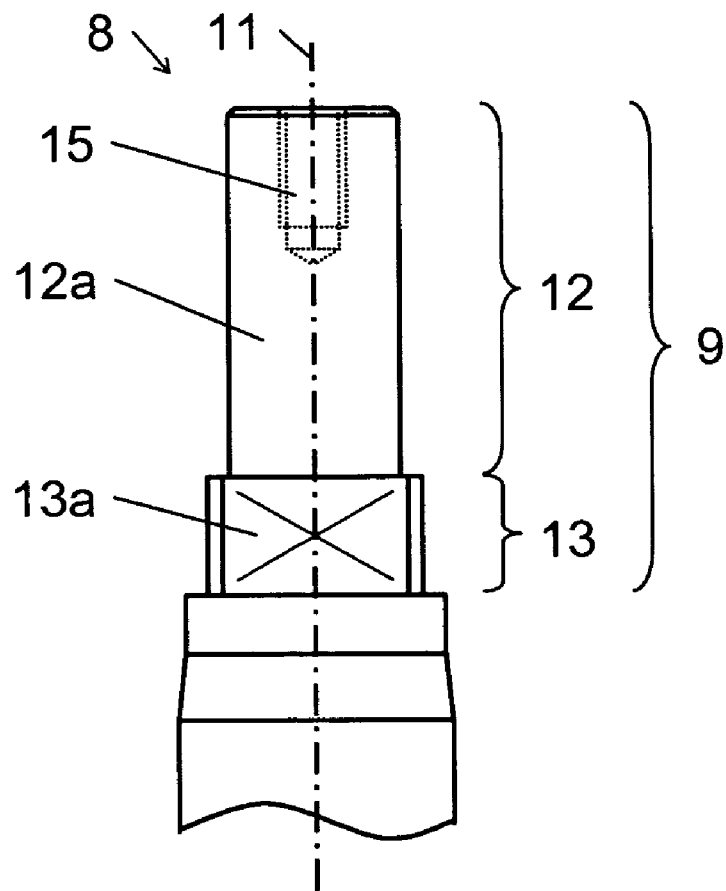
FIGS. 3*a* and 3*b* illustrate a connecting segment of a valve rod in a lateral view and in a top view in accordance with at least one exemplary embodiment.
Figure 3B:
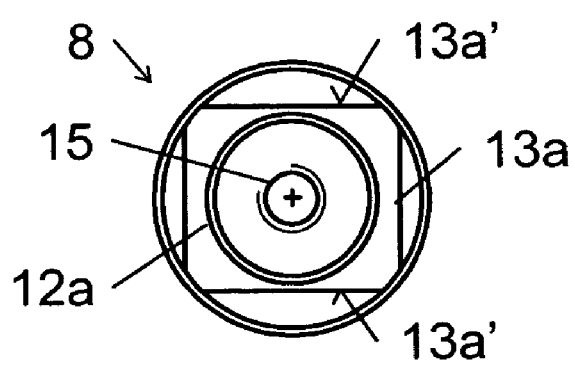

Vacuum gate valves in accordance with at least one embodiment have a valve housing with a wall having an opening and a valve seat surrounding the opening. The opening can have an open section (e.g. rectangular, elliptical, and the like) with variously shaped corners (e.g. rounded corners, straight corners and the like).

In at least one exemplary embodiment, a valve seat can have a wall segment functioning as a sealing surface onto which another surface acting as a sealing surface can be applied. A housing may also be formed by the wall segment. The opening can be closed off by a valve plate. The valve plate can have various shapes (e.g. a rectangular section and the like) such that the sealing surface is dimensioned so that the opening can be closed off with an overlap by the valve plate.

In at least one exemplary embodiment, a sealing ring is fixed to the rim of the sealing face for application to the valve seat. The valve plate is mounted detachably on a valve rod. Via control organs of the vacuum gate valve, the valve rod is supported and adjustable in such a way that the opening can be closed off by moving the valve plate over the opening, essentially along the valve rod axis, and pressing the valve plate with its sealing face against the valve seat. A variety of control organs makes possible such an adjustment of the valve rod and one of ordinary skill of art would be able to construct control organs in accordance with exemplary embodiments.

In at least one exemplary embodiment, a receptacle is formed in the valve plate, and more particularly in one of the two wide lateral faces of the valve plate, while a connecting segment formed at the end of the valve rod, which has a shape corresponding to that of the receptacle, can be engaged in the receptacle.

Receptacle and connecting segments in accordance with exemplary embodiments can have shapes such that together they function as a radial bearing segment and as a segment confining the turning angle. The radial bearing segment allows at least a partial turning of the valve plate relative to the valve rod about the valve rod axis. It can be formed as a bearing (e.g. a plain journal bearing, radial rolling bearing, and the like). It will thus be possible that the alignment of the valve plate about the valve rod axis adapts to the valve seat when the valve plate is pressed against the valve seat. Thus, relative to a plane normal to the valve rod axis, the valve plate becomes oriented parallel to the valve seat, so that the contact pressures are the same at the two peripheral ends of the valve plate. Thus, non-uniform pressure and a variable sealing gap are reduced without the necessity of requiring a highly precise fit and the use of precision alignment.

In at least one exemplary embodiment, a segment confining the turning angle serves to confine the turning allowed by the radial bearing segment to an angular range so that a contact between the valve housing and the valve plate can be avoided, because an excessive turning angle can be avoided while the valve plate is moved over the opening. Thus, at least one exemplary embodiment provides a rough pre-alignment of the valve plate by appropriate adjustment of the control organs. Consequently, in at least one exemplary embodiment, a precise pre-alignment about the valve rod axis can be omitted, since movement of the valve plate allows self-alignment. In at least one exemplary embodiment, the radial bearing segment and the segment confining the turning angle are realized as two separate segments. In at least another exemplary embodiment, both the radial bearing segment and the segment confining the turning angle are realized as a single segment filling both functions.

FIGS. 1a, 1b and 1c show the schematic functioning of a related art vacuum gate valve as already discussed above when presenting the related art. In the description of subsequent figures, part of the reference symbols introduced in FIGS. 1a, 1b and 1c will be used.

FIGS. 2a, 2b, 3a, 3b, 4a, 4b, and 5 illustrate at least one exemplary embodiment of a vacuum gate valve according to the invention in differing views, representations, and degrees of detail, said representations will be described together in the following discussion, sometimes while referring to the individual figure. Some of the elements not visible from outside in particular views are shown in dashed lines. The following reference numeral list is provided for convenience with reference to FIGS. 1a–8c:

Ref. No. Identifier
1 valve housing
2 wall
3 opening
4 valve seat
5 valve plate
6 receptacle (of valve plate)
7 sealing face (of valve plate)
8 valve rod
9 connecting segment (of valve rod)
10 control organs
11 valve rod axis
12 radial bearing segment
12a cylindrical shaft (valve rod)
12b cylindrical bore (valve plate)
13 segment confining the turning angle
13a external tetragonal segment (valve rod)
13a' plane-parallel external faces (valve rod, external tetragonal segment)
13b internal tetragonal segment (valve plate)
13b' plane-parallel internal faces (valve plate)
14 defined angular range
15 first tapped hole (valve rod)
16 through bore (valve plate)
17 side opposite to receptacle
18 screw
19 handle recess (in valve plate)
20 side opposite to sealing face
21 second tapped hole (valve plate, for multiple-function tool)
22 multiple-function tool
23 handle
24 elongated shaft
25 tip of shaft
26 external hexagonal segment
27 external thread
28a arrow
28b arrow
28c arrow
29 service lid (in valve housing)
30 service opening (in valve housing)
31a arrow
31b arrow
31c arrow
32 sealing ring At least one exemplary embodiment provides a vacuum gate valve for closing off an opening. The vacuum gate valve plate is mounted onto a valve rod 8, being supported and adjustable such that the opening 3 can be closed off by moving the valve plate 5 over the opening 3 and pressing the valve plate 5 onto a valve seat 4 surrounding the opening 3. The joint between the valve plate 5 and the valve rod 8 can have a radial bearing segment 12 and a segment 13 confining a turning angle. The radial bearing segment 12 can be used to turn the valve plate 5 relative to valve rod 8 about the valve rod axis 11 so that the alignment of the valve plate 5 about the valve rod axis 11 will adapt to the valve seat 4 when the valve plate 5 is pressed against the valve seat 4. The segment 13 confining the turning angle confines the turning using the radial bearing segment 12 to a defined angular range 14 such that a contact due to an excessive turning angle cannot occur between the valve housing 1 and the valve plate 5 when the valve plate 5 is moved over the opening 3. In addition, further exemplary embodiments contain a multiple-function tool 22 for demounting and mounting the valve plate 5 from and to the valve rod 8.

A vacuum gate valve in accordance with at least one exemplary embodiment (FIGS. 4a and 4b) can have a valve housing 1 with a wall 2 comprising an opening 3 and a valve seat 4 surrounding the opening 3, as well as a valve plate 5 with a sealing face 7 (FIG. 5) the rim of which bears a sealing ring 32 (FIG. 2a) to close off opening 3. In the middle of one of the two wide lateral surfaces of valve plate 5 (relative to the sealing face 7, FIGS. 4a and 4b), a receptacle 6 for admitting the connecting segment 9 of a valve rod 8 is formed. The valve plate 5 can be mounted detachably to valve rod 8 via the connecting segment 9 of valve rod 8, the connecting segment being engaged in receptacle 6 and the valve rod defining a valve rod axis 11. Although the valve plate 5 has been shown (FIGS. 4a and 4b) to be mounted from the bottom, any mounting direction (e.g. top, sides, and the like) are in keeping with exemplary embodiments. Additionally, although the valve plate 5 has been described as being mounted to valve rod 8 via a connecting segment 9, any type of fastening of the valve plate 5 to the valve rod 8 lies within the scope of at least one exemplary embodiment.

The valve rod 8 can be controlled along multiple (e.g. one, two, three and the like) degrees of freedom by control organs 10, for instance by a hydraulic-cylinder and swivel-gear unit. More particularly the valve rode 8 can be shifted linearly along the valve rod axis 11 and swivelled in a plane normal to wall 2.

Figure 4A:
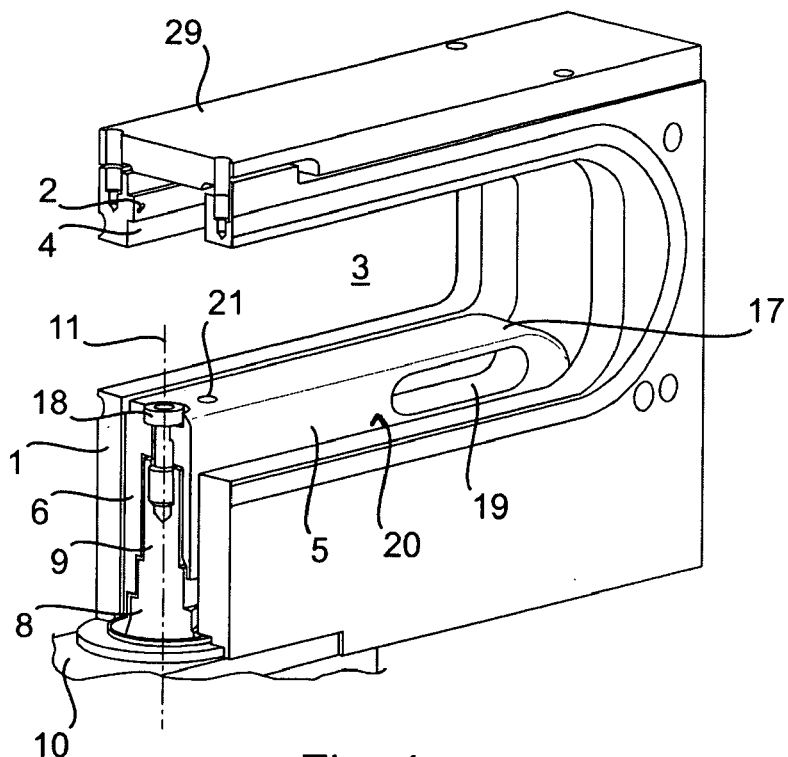
FIG. 4*a* illustrates a sectioned oblique view of a vacuum gate valve with the valve plate mounted in accordance with at least one exemplary embodiment.
Figure 4B:
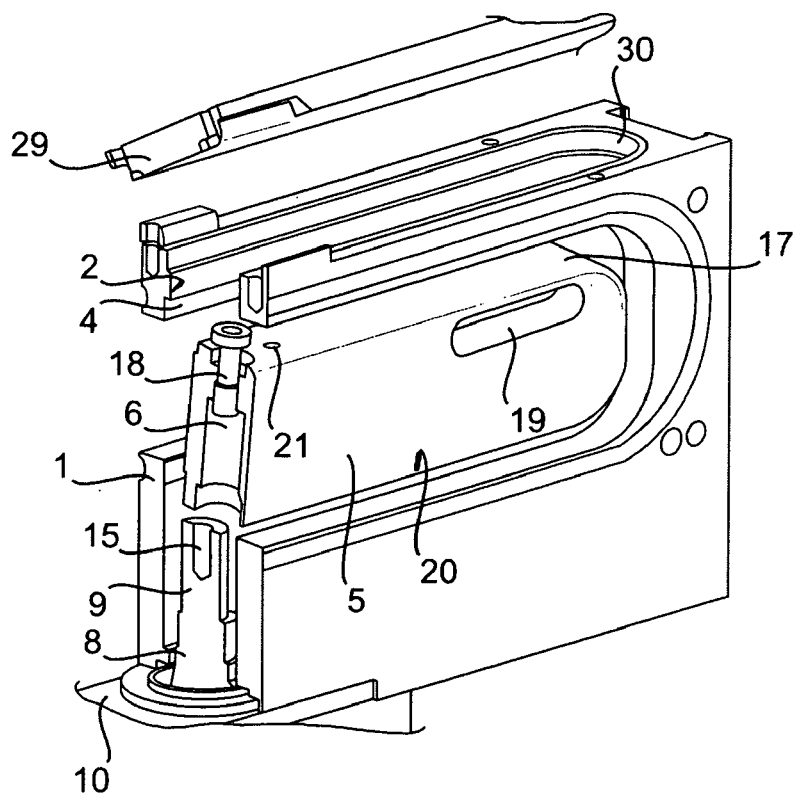
FIG. 4*b* illustrates a sectioned oblique view of a vacuum gate valve with the valve plate demounted in accordance with at least one exemplary embodiment.
Figure 5:
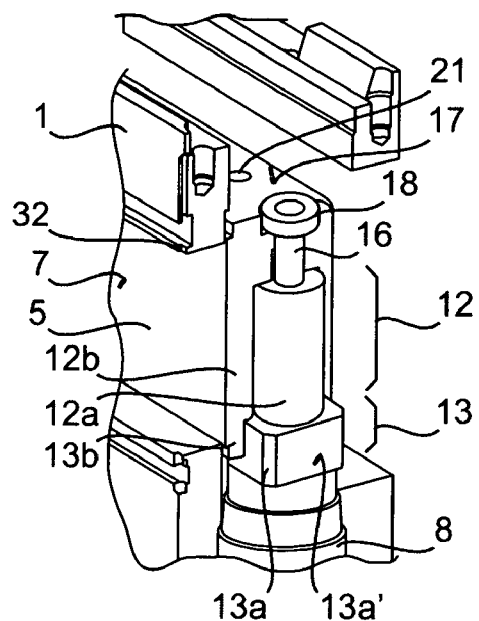
FIG. 5 illustrates a detailed view of the receptacle and of the connecting segment in accordance with at least one exemplary embodiment.

FIGS. 4a and 5 show a situation where the valve plate 5 is mounted on valve rod 8, while FIGS. 2a, 2b, 3a, 3b, and 4b each show a demounted situation. Via control organs 10 (FIGS. 4a and 4b), the valve rod 8 is supported and adjustable in such a way that the opening 3 can be closed off by moving the valve plate 5 over the opening, with at least one movement essentially along the valve rod axis 11, and pressing the valve plate 5 with sealing ring 32 of the sealing face 7 against valve seat 4.

Together, receptacle 6 and the connecting segment 9 form two functional segments, viz., a radial bearing segment 12 and a segment 13 (FIGS. 3a, 2b), which in at least one exemplary embodiment can be used to confine the turning angle. In at least one exemplary embodiment the radial bearing segment 12 enables at least a partial turning of valve plate 5 relative to valve rod 8 about the valve rod axis 11 so that the alignment of valve plate 5 about the valve rod axis 11 adapts to valve seat 4, at least during a first application of the valve plate 5 to the valve seat 4 (FIGS. 4a, 4b, 6b). In at least one exemplary embodiment, the radial bearing segment 12 is formed in receptacle 6 of the valve plate 5 as a cylindrical shaft 12a (FIGS. 3a, 3b, and 5) on the connecting segment 9 of valve rod 8 and as a cylindrical bore 12b matching the cylindrical shaft 12a. Cylindrical shaft 12a is pivoted slidingly in the cylindrical bore 12b (FIG. 5) with a clearance fit or a transition fit. In at least one exemplary embodiment a rolling bearing can be used rather than a friction bearing or a plain journal bearing, as the radial bearing segment 12.

Figure 6A:
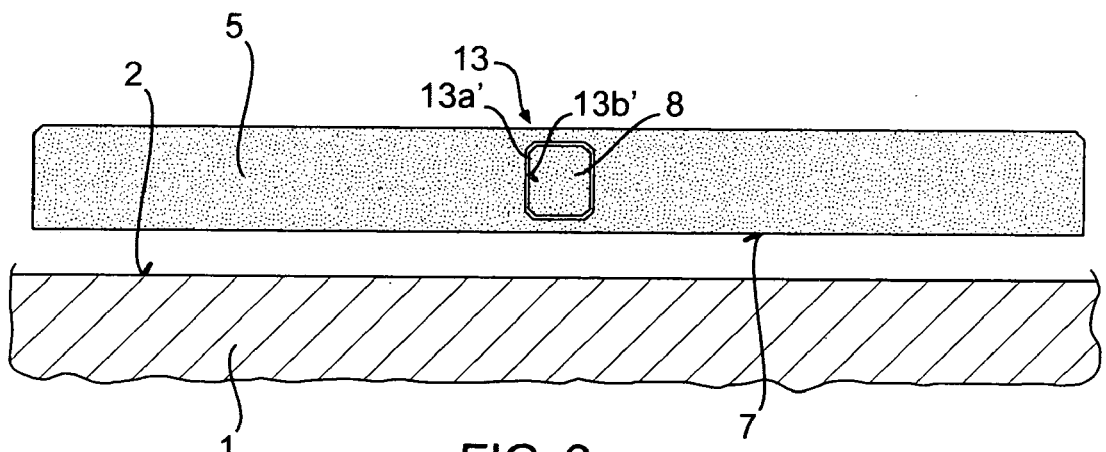
FIG. 6*a* illustrates a schematic section through the segment confining the turning angle with the valve plate positioned centrally in accordance with at least one exemplary embodiment.
Figure 6B:
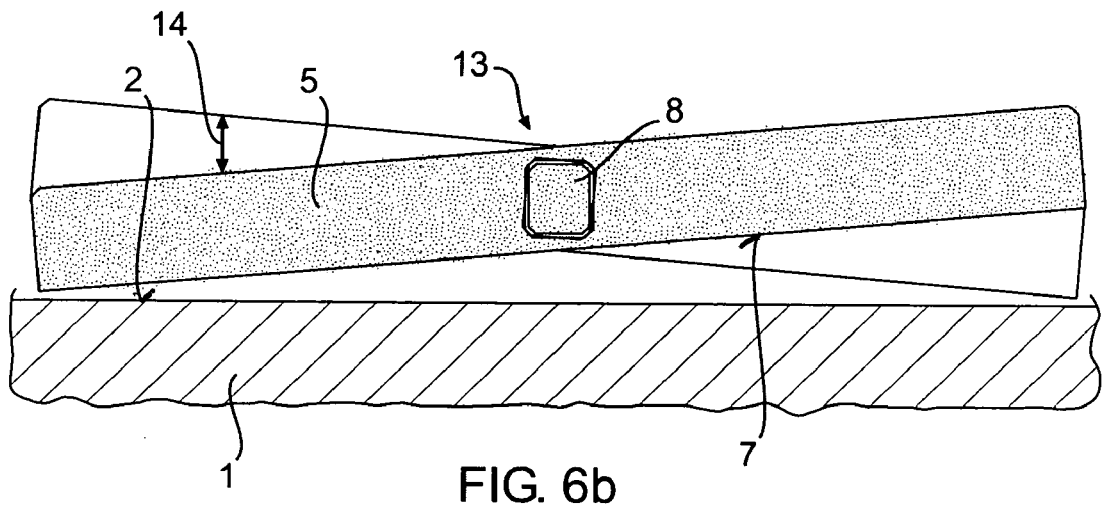
FIG. 6*b* illustrates a schematic section through the segment confining the turning angle illustrating the possible turning range of the valve plate in accordance with at least one exemplary embodiment.

The second functional segment, viz., the segment 13 confining the turning angle, confines the turning (e.g. by the radial bearing segment 12) to a defined angular range 14 (FIGS. 6a and 6b). The turning is confined so that a contact between the valve housing 1 and the valve plate 5 caused by an overly large turning angle will be avoided while the valve plate 5 is moved over the opening 3. In the embodiment shown (FIGS. 6a and 6b), the segment 13 confining the turning angle is formed as an external polygonal segment on the connecting segment 9 of valve rod 8 and as an internal polygonal segment matching the external polygonal segment in receptacle 6 of valve plate 5. The oversize of the internal polygonal segment relative to the external polygonal segment is such that the turning is confined to a defined angular range 14 (FIGS. 6a and 6b). Here the internal polygonal segment is realized by an internal tetragonal segment 13b with at least two plane-parallel internal faces 13b', the external polygonal segment is realized as an external tetragonal segment 13a with plane-parallel external faces 13a'. However, other realizations of the internal and external polygonal segments are possible. For instance, instead of a tetragonal segment, a trigonal or pentagonal segment may be employed, while the edges delimiting the internal and external faces, respectively, may of course be rounded, or they may be beveled, as in the embodiment shown. Thus, although polygon segments are shown, exemplary embodiments can have variable shapes without departing from the spirit and scope of the present invention.

The front face of the connecting segment 9 of valve rod 8 can have a central tapped hole 15 having its axis on the valve rod axis 11. In the following, this tapped hole 15 will be designated as the first tapped hole 15. In addition, centrally along valve rod axis 11 in the valve plate 5 between the end of receptacle 6 and the side 17 opposite to receptacle 6, a through bore 16 can be provided through which a screw 18 can be passed in order to be screwed into the first tapped hole 15, so that valve plate 5 can be fastened to valve rod 8 while being detachable along valve rod axis 11. Through bore 16 can have a counterbore accepting the screw head. Screw 18 is more particularly secured against being lost.

FIGS. 4a and 5 illustrate at least one exemplary embodiment in which valve plate 5 is mounted to the valve rod by means of screw 18. The screw 18 is shown as a cylindrical hexagon socket head screw with an internal hexagonal socket, although any type screw can be used. It is possible, of course, to select other ways of screw connection and other fastening means and the discussion herein is not intended to limit the scope of fastening.

In at least one further exemplary embodiment, the receptacle described above is situated on the valve rod, and the connecting segment is situated on the valve plate as a pin. In this case the first tapped hole can be formed in the receptacle, and the through bore can be formed in the connecting segment. In addition, a longer screw can be used. Of course, still other realizations are possible.

On the side 17 opposite to receptacle 6, the valve plate 5 can have a tapped hole 21, which in the following will be designated as the second tapped hole 21. This tapped hole can be situated in a central region next to the through bore 16. Using the second tapped hole 21 one can screw a tool into tapped hole 21, and thus manually apply a force to the valve plate 5, essentially upwards along valve rod 11, in order to take the valve plate 5 off the valve rod 8 after loosening screw 18. Thus, it is possible by intervention from just one side 17 to demount the valve plate 5 from the valve rod 8, by loosening screw 18 and subsequent lifting via the second tapped hole 21, so that for instance a maintenance operation can be performed on valve plate 5. Here, screw 18 is formed as an Allen screw having an associated wrench size with a width across corners smaller than the minor diameter of the second tapped hole 21 of valve plate 5, so that a hexagonal pin having the width across corners of Allen screw 18 can be introduced through the second tapped hole 21. A tapped hole generally is understood to be an internal thread regardless of the way in which it was formed. Similar demounting methods can be used in accordance with exemplary embodiments depending upon the fastening mechanism chosen for fastening valve plate 5 with valve rod 8. For example several tapped holes can be used to place several multiple-function tools, at various positions (not just the top), to lift the valve plate 5, reducing contact with the wall 2. Likewise several guide pins can be used to reduce the chance of the valve plate 5 contacting with the wall 2, while demounting. Further automatic demounting systems can be used instead of the described manual system in accordance with exemplary embodiments.

In at least one exemplary embodiment the valve housing 1 can have a service opening 30 (FIG. 4b) at the top, which can be opened by removing a lid 29 (FIGS. 4a and 4b). Both the loosening of screw 18 and the lifting of valve plate 5 from the valve rod 8, and thus the entire demounting of the valve plate 5, can simply and ergonomically occur via this service opening 30. For an even better handling of the valve plate during demounting, for instance, two handle recesses 19 can be formed in the side 20 opposite to the sealing face 7 so that manually or automatically, force can be applied to the valve plate 5, essentially upwards to lift it from valve rod 8 and/or to enable better manipulation of valve plate 5 after demounting. For better grip, the handle recesses 19 can have a non-skid coating inside. Although the discussion describes demounting upwards, the direction is arbitrary and can be sideways depending upon the configuration of the valve housing.

FIGS. 6a and 6b show a schematic section through the segment 13 confining the turning angle, normal to valve rod axis 11 in accordance with at least one exemplary embodiment. Shown are part of the valve housing 1, wall 2, valve plate 5 and valve rod 8 with segment 13 confining the turning angle and the plane-parallel external surfaces 13a' of the external tetragonal segment 13a of valve rod 8 and the plane-parallel internal surfaces 13b' of the internal tetragonal segment 13b of valve plate 5. One can recognize the oversize exhibited by the internal tetragonal segment 13b relative to the external tetragonal segment 13a. The internal and external tetragonal segments 13a and 13b respectively, can have variable shapes (e.g. a rectangular cross section with identical edge lengths or with different edge lengths, as in the example shown). The oversize may be identical in the two dimensions, as illustrated, or it may be different. FIG. 6a shows the valve plate 5 in its central position while FIG. 6b shows the maximum angular range 14 as confined by the confining segment 13. The oversize can be such that mobility is restricted to the angular range 14 within which a contact between the sealing face 7 and the wall 2—and particularly of valve seat 4—cannot occur when moving it over the opening 3. It is possible, of course, to have an angular range 14 that varies from the example shown (e.g. smaller or larger). In at least one exemplary embodiment an angular range 14 that is as small as possible can be used. Likewise at least another exemplary embodiment uses a larger turning angle, which can reduce the shear forces acting on sealing ring. The angular range 14 can be large enough to enable free alignment of the valve plate 5 during its application.

Figure 7:
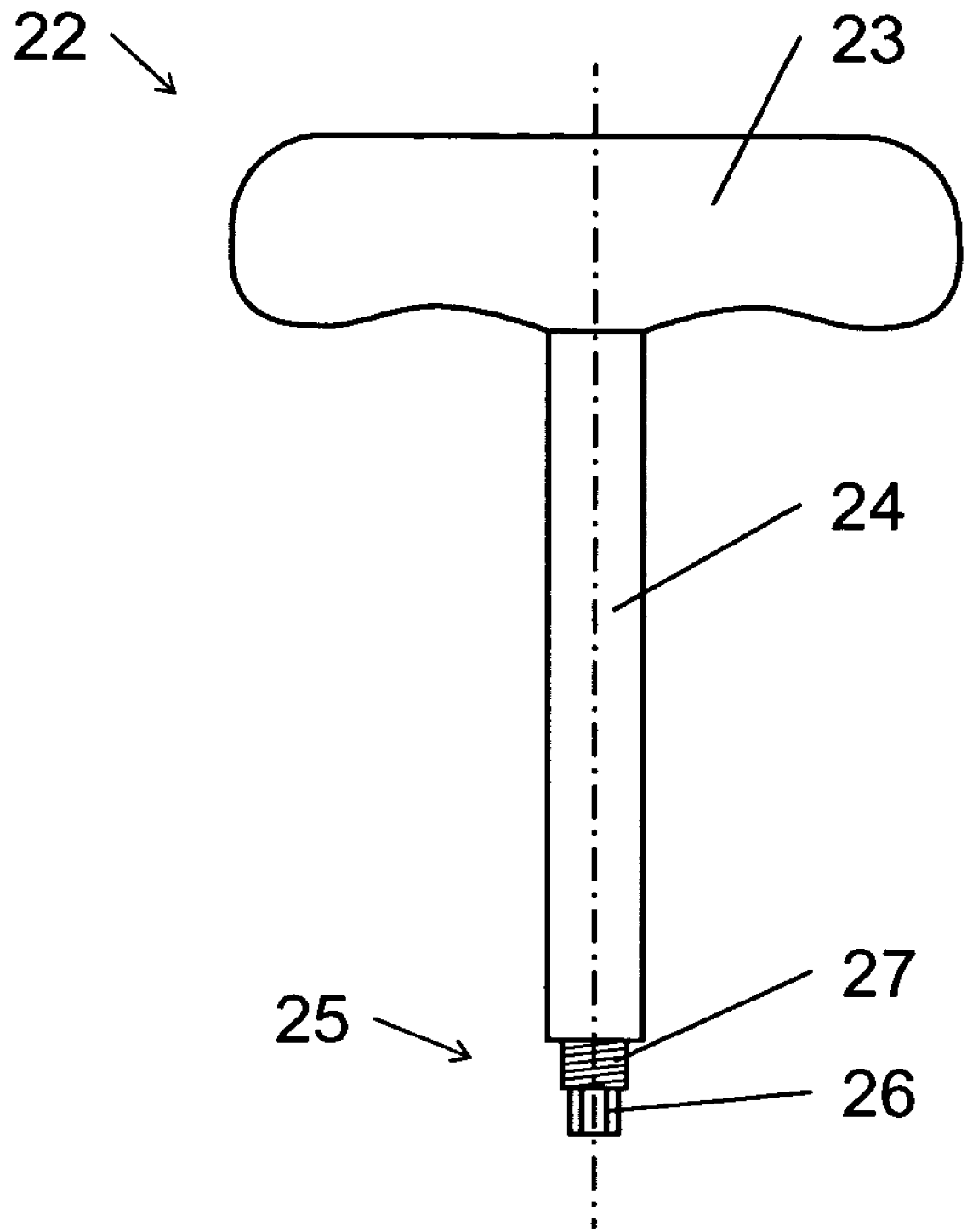
FIG. 7 illustrates a multiple-function tool for demounting and mounting the valve plate in accordance with at least one exemplary embodiment.

If the demounting of the valve plate 5 is preformed manually, a multiple-function tool 22 can be used. FIG. 7 shows a multiple-function tool 22 for demounting and mounting of valve plate 5 from/to valve rod 8 of the vacuum gate valve. This multiple-function tool 22 serves, both to loosen the screw 18 and to withdraw the valve plate 5 from valve rod 8 by screwing into the second tapped hole 21 and applying lifting force. The multiple-function tool 22 has a handle 23 for manual application of lifting force and torque, and an elongated straight shaft 24, particularly a cylindrical shaft the first end of which is attached to handle 23. The other end of shaft 24 has an external hexagonal segment 26 at its tip 25, in particular so that a torque can be applied to screw 18 manually. The external hexagonal segment 26 is followed by an external thread 27 in the adjacent segment on shaft 24, designated to make a screwed connection with the second tapped hole 21 of valve plate 5. Using the multiple-function tool 22, one can thus apply force, more particularly manually, upwards along valve rod axis 11 to the valve plate 5 in order to lift it from the valve rod 8. The wrench size of the external hexagonal segment 26 corresponds to that of screw 18, and thus has a width across corners smaller than the minor diameter of the external thread 27 that corresponds to the thread of the second tapped hole 21. Although discussion herein concerning the multiple-function tool discusses shapes (e.g. hexagonal), relation between sizes of particular parts (e.g. external hexagonal segment 26) and manual operation, exemplary embodiments are intended to include within their scope various screws or fasteners, sizes and relative sizes, and automatic and manual operation.

The vacuum gate valve, valve plate 5 and multiple-function tool 22 described above can be employed even without using the radial bearing segment and segment confining the turning angle that were described above, while particularly from an ergonomic point of view, considerable improvements over the related art are achieved, particularly by using the second tapped hole 21, the handle recesses 19, screw 18 and the multiple-function tool 22.

Figure 8A:
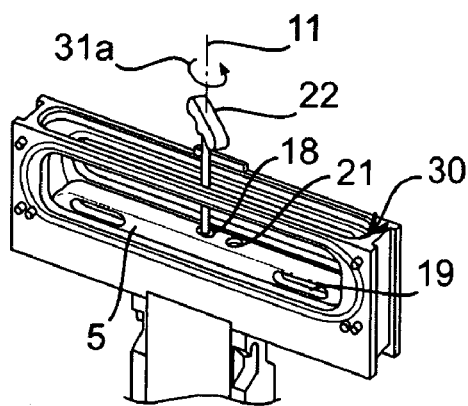
FIGS. 8*a*, 8*b* and 8*c* illustrate the demounting of the valve plate using the multiple-function tool in accordance with at least one exemplary embodiment.
Figure 8B:
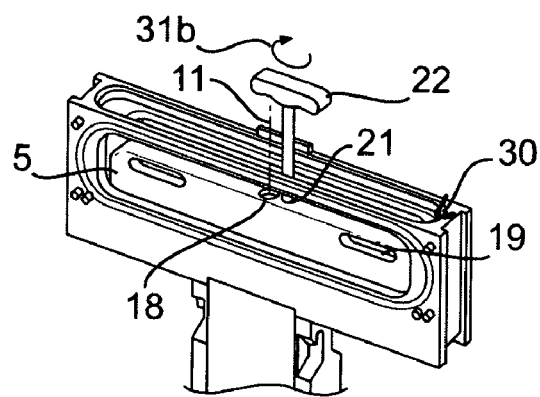
Figure 8C:
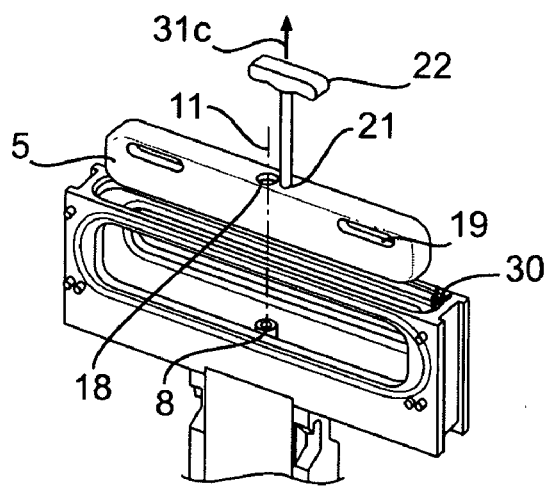

FIGS. 8a, 8b, and 8c illustrate the operation of demounting valve plate 5 from valve rod 8 in accordance with at least one exemplary embodiment. In a first step (FIG. 8a), the multiple-function tool 22 can be placed onto screw 18 via the opened service opening 30, and screw 18 is loosened by means of the external hexagonal segment 26 by turning the multiple-function tool 22 about the valve rod axis 11, as shown by arrow 31a. In a second step (FIG. 8b), the multiple-function tool 22 can be screwed into the second tapped hole 21 by means of external thread 27 following the arrow 31b. In a third step (FIG. 8c), lifting force is applied upwards manually, see arrow 31c, whereby valve plate 5 can be lifted from the valve rod 8 and removed from the vacuum gate valve via service opening 30.

In exemplary embodiments with handle recesses 19, the handle recesses 19 can be used to lift the valve plate 5 from valve rod 8 without opening the service opening 30. When screw 18 has been loosened, one can reach manually/automatically into the handle recesses 19, to remove it from the valve housing 1. Access to and removal of the valve plate 5 can occur, more particularly from the side 20 opposite to the sealing face 7, for example through an opening in the valve housing 1 that is opposite to opening 3, as shown in FIG. 4b.

In exemplary embodiments the joint between valve rod 8 and valve plate 5 can be formed for instance by means of a connecting segment 9 on valve rod 8, which is guided into and fastened inside a receptacle 6 formed in valve plate 5. One of ordinary skill in the art of fastening would know various manners of fastening valve rod 8 in accordance with exemplary embodiments.

Exemplary embodiments of the valve plate 5 can have various wall thicknesses (e.g. thicker in the middle, ends, or the like), various receptacle or fasteners for the valve rod 8, various wall thicknesses between receptacle and the sealing, and various protrusions on the valve rod 8.

In exemplary embodiments the design of valve plate 5, receptacle, and connecting segment can be designed to avoid excessive bending of the valve plate 5 when pressed onto the valve seat.

In exemplary embodiments, elastic sealing material (e.g. for sealing rings) can be made of various materials (e.g. the material known under the trade name of Viton® and the like). Various kinds of control organs 10 can be designed to provide different directions of the control of valve rod 8 and thus of the valve plate 5. Thus, various control rods 8 can have various motions of the path of the valve plate 5 (e.g. exemplary embodiments can provide an arched swivel path of valve plate 5 toward valve seat 4, an absolutely linear motion of the valve plate 5 normal to wall 2 and the like motions).

The description of the invention is merely exemplary in nature and, thus, variations that do not depart from the gist of the invention are intended to be within the scope of the embodiments of the present invention. Such variations are not to be regarded as a departure from the spirit and scope of the present invention (e.g., various shaped valve plates 5, valve rods 8, and multi-function tool 22 and materials can be used in accordance with exemplary embodiments).

What is claimed is:

1. A vacuum gate valve comprising:
   a valve housing with a wall having an opening and a valve seat surrounding the opening;
   a valve plate in which a receptacle is formed and which has a sealing face for closing off the opening; and
   a valve rod disposed within the valve housing on which the valve plate is detachably mounted via a connecting segment of the valve rod engaging into the receptacle, and which via control organs is supported and adjustable in such a way that by moving the valve plate over the opening by essentially following the valve rod axis and by pressing the sealing face of the valve plate against the valve seat the opening can be closed off, where the receptacle and the connecting segment engaging into the receptacle comprise:
      a radial bearing segment making possible an at least partial turning of the valve plate relative to the valve rod about the valve rod axis, so that the alignment, of the valve plate about the valve rod axis will adapt to the valve seat, at least when the valve plate is pressed for a first time onto the valve seat, and
      a segment confining the turning angle which confines the turning made possible by the radial bearing segment to a defined angular range, so that, while the valve plate is moved over the opening, no contact will occur between the valve housing and the valve plate due to an excessive turning angle.

2. The vacuum gate valve of claim 1, wherein the radial bearing segment that makes the turning possible, is formed as
   a cylindrical shaft on the connecting segment of the valve rod and
   a cylindrical bore matching the cylindrical shaft, in the receptacle of the valve plate,
   the cylindrical shaft being pivoted slidingly in the cylindrical bore with a clearance fit or with a transition fit.

3. The vacuum gate valve of claim 1, wherein the segment confining the turning angle to a defined angular range is formed as
   an external polygonal segment on the connecting segment of the valve rod and
   an internal polygonal segment matching the external polygonal segment, in the receptacle of the valve plate,
   the internal polygonal segment having an oversize relative to the external polygonal segment which is such that the turning is confined to the defined angular range.

4. The vacuum gate valve of claim 3, wherein
   the external polygonal segment is formed as an external tetragonal segment with plane-parallel external faces; and
   the internal polygonal segment is formed as an internal tetragonal segment with plane-parallel internal faces.

5. The vacuum gate valve of claim 1, further comprising
   a first tapped hole arranged on the side of the connecting segment of the valve rod, essentially in the valve rod axis,
   a through bore in the valve plate along the valve rod axis between the receptacle and the side opposite to the receptacle, and
   a screw passing through the through bore and engaging into the first tapped hole,
so that the valve plate is fastened axially detachably along the valve rod axis to the valve rod.

6. The vacuum gate valve of claim 1, wherein the valve plate comprises at least one handle recess formed in the side opposite to the sealing face, for manually applying a force to the valve plate, essentially along the valve rod axis in particular for detaching the valve plate from the valve rod.

7. The vacuum gate valve of claim 5, wherein
   the valve plate comprises at least one second tapped hole on the side opposite to the receptacle for receiving a multiple-function tool in order to manually apply a force to the valve plate, essentially along the valve rod axis, in particular for detaching the valve plate from the valve rod, and
   the screw is formed as a hexagon socket head screw having an associated wrench size with a width across corners smaller than the minor diameter of the second tapped hole of the valve plate.

8. A Multiple-function tool for mounting and demounting a valve plate to and from a valve rod of the vacuum gate valve of claim 7, comprising:
   a handle, where the handle can apply a lifting force and a torque; and
   an elongated straight shaft, wherein the first end of the shaft is attached to the handle and wherein at the second end of the shaft at the tip an external hexagonal segment is formed for applying a torque to the hexagon socket head screw and in a segment adjacent to the external hexagon segment, an external thread is formed for making a screwed connection to the second tapped hole of the valve plate so as to apply a force to the valve plate along the valve rod axis, in particular in order to detach the valve plate from the valve rod, the width across corners of the external hexagonal segment being smaller than the minor diameter of the external thread.

9. A system comprising:
   a vacuum gate valve comprising:
      a valve housing with a wall having an opening and a valve seat surrounding the opening;
      a valve plate in which a receptacle is formed and which has a sealing face for closing off the opening;
      a valve rod on which the valve plate is detachably mounted via a connecting segment of the valve rod engaging into the receptacle, and which via control organs is supported and adjustable in such a way that by moving the valve plate over the opening by essentially following the valve rod axis and by pressing the sealing face of the valve plate against the valve seat the opening can be closed off, where the receptacle and the connecting segment engaging into the receptacle comprise:
         a radial bearing segment making possible an at least partial turning of the valve plate relative to the valve rod about the valve rod axis, so that the alignment of the valve plate about the valve rod axis will adapt to the valve seat, at least when the valve plate is pressed for a first time onto the valve seat, and
         a segment confining the turning angle which confines the turning made possible by the radial bearing segment to a defined angular range, so that, while the valve plate is moved over the opening, no contact will occur between the valve housing and the valve plate due to an excessive turning angle;
      a first tapped hole arranged on the side of the connecting segment of the valve rod, essentially in the valve rod axis;
      a through bore in the valve plate along the valve rod axis between the receptacle and the side opposite to the receptacle;

a screw passing through the through bore and engaging into the first tapped hole, so that the valve plate is fastened axially detachably along the valve rod axis to the valve rod, wherein the valve plate comprises at least one second tapped hole on the side opposite to the receptacle for receiving a multiple-function tool in order to manually apply a force to the valve plate, essentially along the valve rod axis, in particular for detaching the valve plate from the valve rod, and the screw is formed as a hexagon socket head screw having an associated wrench size with a width across corners smaller than the minor diameter of the second tapped hole of the valve plate; and the multiple-function tool for mounting and demounting the valve plate to and from the valve rod of the vacuum gate valve, said tool comprising:

a handle, where the handle can apply a lifting force and a torque; and an elongated straight shaft, wherein the first end of the shaft is attached to the handle and wherein at the second end of the shaft at the tip an external hexagonal segment is formed for applying a torque to the hexagon socket head screw and in a segment adjacent to the external hexagon segment, an external thread is formed for making a screwed connection to the second tapped hole of the valve plate so as to apply a force to the valve plate along the valve rod axis, in particular in order to detach the valve plate from the valve rod, the width across corners of the external hexagonal segment being smaller than the minor diameter of the external thread.

10. A valve plate for a vacuum gate comprising:

a sealing face having at least one sealing ring for closing off an opening in a wall of a valve housing; and a receptacle formed laterally in the valve plate, relative to the sealing face, for detachably mounting the valve plate to a valve rod disposed within the valve housing by engaging a connecting segment of the valve rod into the receptacle, the valve rod being supported and adjustable via control organs in such a way that by moving the valve plate over the opening, essentially along the valve rod axis, and pressing the valve plate with its sealing ring onto a valve seat surrounding the opening, the opening (3) can be closed off, where the receptacle comprises:

a radial bearing segment making possible an at least a partial turning of the valve plate relative to the valve rod about the valve rod axis, so that the alignment of valve plate about the valve rod axis will adapt to the valve seat, at least when the valve plate is pressed for a first time onto the valve seat; and a segment confining the turning angle which confines the turning made possible by the radial bearing segment to a defined angular range, so that, while the valve plate is moved over the opening, no contact will occur between the valve housing and the valve plate due to an excessive turning angle.

11. The valve plate of claim 10, wherein the radial bearing segment making possible the turning is formed as a cylindrical bore in the receptacle, so that a cylindrical shaft on the connecting segment of valve rod matching the cylindrical bore can be slidingly pivoted with a clearance fit or with a transition fit.

12. The valve plate of claim 10, wherein the segment confining the turning angle which confines the turning to a defined angular range is formed as an internal polygonal segment in the receptacle in order to receive an external polygonal segment on the connecting segment of the valve rod matching the internal polygonal segment, the internal polygonal segment having an oversize relative to the external polygonal segment which is such that the turning is confined to the defined angular range.

13. The valve plate of claim 12, wherein the internal polygonal segment is formed as an internal tetragonal segment with plane-parallel internal faces in order to receive an external tetragonal segment with plane-parallel external faces forming the external polygonal segment on the connecting segment.

14. The valve plate of claim 10, further comprising a through bore along the valve rod axis between receptacle and the side opposite to receptacle for passing a screw which can be engaged in a first tapped hole arranged on the side of the connecting segment of the valve rod, essentially in the valve rod axis so that the valve plate can be fastened axially detachably along the valve rod axis to the valve rod.

15. The valve plate of claim 10, further comprising at least one handle recess formed in the side opposite to the sealing face, for applying a force to the valve plate, essentially along the valve rod axis, in particular for detaching the valve plate from the valve rod.

16. The valve plate of claim 10, wherein on the side opposite to receptacle, at least a second tapped hole is formed for receiving a multiple-function tool in order to apply a force to the valve plate, essentially along the valve rod axis, particularly for detaching the valve plate from the valve rod.

17. A vacuum gate valve comprising:

a valve plate, having a sealing face, where the valve plate is operatively attached to at least one valve rod having a valve rod axis, where the valve plate can have a rotation relative to the at least one valve rod, wherein the axis of rotation is the valve rod axis so that when the valve plate is pressed against a valve seat the valve plate can rotate to align with the valve seat, where the valve seat is attached to a valve housing, wherein the rotation angle can have a maximum turning angle determined by a turning angle segment, wherein the maximum turning angle is determined so that when the valve plate is moved to position to be pressed against the valve seat, the valve plate does not touch the valve housing prior to being pressed against the valve seat, and wherein the turning angle segment is an external polygonal segment on the at least one valve rod, where the external polygonal segment is placed into an internal polygonal cavity segment of the valve plate, the internal polygonal cavity segment having a size larger than the external polygonal segment such that the valve rod can be rotated to the maximum turning angle defined by the final angle allowable when the external polygon segment rotates and touches a side wall of the internal polygonal cavity segment.

18. The valve gate according to claim 17, wherein the valve rod has a valve rod axis and where the rotation has a rotation angle about the valve rod axis.

* * * * *